US008854399B2

(12) United States Patent
Arkhipov et al.

(10) Patent No.: US 8,854,399 B2
(45) Date of Patent: Oct. 7, 2014

(54) DISPLAY DEVICE AND DRIVING METHOD THEREOF

(75) Inventors: Alexander Arkhipov, Yongin (KR); Baek-Woon Lee, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 728 days.

(21) Appl. No.: 13/037,209

(22) Filed: Feb. 28, 2011

(65) Prior Publication Data

US 2012/0044270 A1 Feb. 23, 2012

(30) Foreign Application Priority Data

Aug. 20, 2010 (KR) ........................ 10-2010-0080960

(51) Int. Cl.

| | |
|---|---|
| ***G09G 5/02*** | (2006.01) |
| ***G06F 3/038*** | (2013.01) |
| ***G09G 5/00*** | (2006.01) |
| ***G09G 3/30*** | (2006.01) |
| ***G09G 3/32*** | (2006.01) |
| *G09G 3/20* | (2006.01) |

(52) U.S. Cl.

CPC ............ *G09G 3/32* (2013.01); *G09G 2330/021* (2013.01); *G09G 2320/0626* (2013.01); *G09G 2360/16* (2013.01); *G09G 2320/0271* (2013.01); *G09G 3/2092* (2013.01); *G09G 2360/18* (2013.01); *G09G 2340/16* (2013.01); *G09G 3/3233* (2013.01); *G09G 2320/043* (2013.01)

USPC .............................. 345/690; 345/208; 345/76

(58) Field of Classification Search

USPC ......................................................... 345/690

See application file for complete search history.

(56) References Cited

U.S. PATENT DOCUMENTS

| | | | | |
|---|---|---|---|---|
| 2004/0201582 A1* | 10/2004 | Mizukoshi et al. | ........... | 345/211 |
| 2007/0152937 A1 | 7/2007 | Jung et al. | | |
| 2008/0180367 A1 | 7/2008 | Lee | | |
| 2009/0033602 A1* | 2/2009 | Alexander et al. | .............. | 345/77 |
| 2009/0201232 A1* | 8/2009 | Kim | ................................ | 345/76 |

FOREIGN PATENT DOCUMENTS

| | | | |
|---|---|---|---|
| CN | 1996454 | A | 7/2007 |
| CN | 101217021 | A | 7/2008 |
| EP | 1942485 | A2 | 7/2008 |
| KR | 10-2007-0072149 | A | 7/2007 |
| KR | 10-2008-0064525 | A | 7/2008 |
| KR | 10-2009-0012381 | A | 2/2009 |
| KR | 10-2009-0125414 | A | 12/2009 |
| WO | WO 2009148244 | A2 | 12/2009 |

OTHER PUBLICATIONS

Arkhipov, et al., "Using Net Power Control for AMOLED TV," IMID 2007 Digest, pp. 47-50, 4 pages.

European Search Report dated Nov. 16, 2011, for corresponding European Patent application 11178119.1, noting listed Category X reference in this IDS, 10 pages.

* cited by examiner

*Primary Examiner* — Alexander S Beck
*Assistant Examiner* — Sejoon Ahn
(74) *Attorney, Agent, or Firm* — Christie, Parker & Hale, LLP

(57) ABSTRACT

A display device includes a display panel, a gray scale converter, and a scale factor generator. The display panel includes a plurality of pixels. The gray scale converter is for converting gray levels of pixel data signals of a current frame by multiplying the pixel data signals of the current frame by a scale factor of the current frame. The scale factor generator is for comparing a conversion current value with an overcurrent prevention current value to generate the scale factor of the current frame.

21 Claims, 7 Drawing Sheets

DISPLAY DEVICE AND DRIVING METHOD THEREOF

CROSS-REFERENCE TO RELATED APPLICATIONS

This U.S. non-provisional patent application claims the benefit of and priority under 35 U.S.C. §119 of Korean Patent Application No. 10-2010-0080960, filed on Aug. 20, 2010, the entire contents of which are hereby incorporated by reference.

BACKGROUND

1. Field

The present disclosure relates to a display device and a driving method thereof.

2. Description of Related Art

Recently, lighter and thinner of display devices such as monitors and televisions have been developed. As a type of display device that satisfies such characteristics, organic light emitting diode (OLED) displays are attracting much attention.

OLED displays include two electrodes, and an emission layer disposed therebetween. In OLED displays, an electron injected from one of the two electrodes and a hole injected from the other electrode are combined in the emission layer to form an exciton, and the exciton releases energy to emit light. The electrode includes a thin film transistor for controlling the emission layer.

Since OLED displays are self-emitting display devices, a current supply line is additionally utilized to drive OLED displays. When an overcurrent is supplied to an OLED display through a current supply line, the service life of the OLED display can be shortened. Therefore, research is being done to prevent or reduce overcurrent from flowing in OLED displays.

SUMMARY OF THE INVENTION

The present disclosure provides a display device which increases service life.

The present disclosure also provides a display device which minimizes or reduces the generation of an overcurrent.

The present disclosure also provides a display device having high reliability.

Embodiments of the inventive concept provide a display device including: a display panel including a plurality of pixels; a gray scale converter for converting gray levels of pixel data signals of a current frame by multiplying the pixel data signals of the current frame by a scale factor of the current frame; and a scale factor generator for comparing a conversion current value with an overcurrent prevention current value to generate the scale factor of the current frame, wherein the conversion current value is a current value projected to be consumed by the display panel utilizing the pixel data signals of the current frame multiplied by a scale factor of a previous frame, and wherein the overcurrent prevention current value is less than a maximum current consumption value of the display panel and greater than a threshold current value of the display panel that is also less than the maximum current consumption value.

In some embodiments, when the conversion current value is greater than the overcurrent prevention current value, the scale factor of the current frame may be configured to be increased when the overcurrent prevention current value is increased.

In other embodiments, the scale factor of the current frame may be configured to be decreased when an original current value projected to be consumed by the display panel when a scale factor is not applied is increased.

In still other embodiments, the scale factor of the current frame may be set to be a value obtained by dividing the overcurrent prevention current value by the original current value, and then raising the result to the $1/\gamma$-th power, wherein $\gamma$ corresponds to a gamma value of the display panel.

In even other embodiments, when the conversion current value is less than the overcurrent prevention current value, the scale factor generator may be configured to compare the conversion current value with a lower limit threshold current value and an upper limit threshold current value to generate the scale factor of the current frame, wherein the lower limit threshold current value is less than the threshold current value, and the upper limit threshold current value is greater than the threshold current value and less than the overcurrent prevention current value.

In yet other embodiments, a difference between the lower limit threshold current value and the threshold current value and a difference between the upper limit threshold current value and the threshold current value may each be equal to or less than about 1% of the threshold current value.

In further embodiments, when the conversion current value has a value between the lower limit threshold current value and the upper limit threshold current value, the scale factor of the current frame may be set to be the same as the scale factor of the previous frame.

In still further embodiments, when the conversion current value is outside of a range from the lower limit threshold current value to the upper limit threshold current value, the scale factor of the current frame may be adjusted from the scale factor of the previous frame by an amount proportional to a value obtained by subtracting the threshold current value from the conversion current value.

In even further embodiments, when the conversion current value is less than the lower limit threshold current value, the scale factor of the current frame may be adjusted to be greater than the scale factor of the previous frame.

In yet further embodiments, when the conversion current value is greater than the upper limit threshold current value, the scale factor of the current frame may be adjusted to be less than the scale factor of the previous frame.

In more embodiments, the scale factor of the current frame and the scale factor of the previous frame may each be greater than 0 and equal to or less than 1.

In still more embodiments, the gray scale converter may include: a frame memory for storing the pixel data signals of the current frame; and a pixel data converter for converting the gray levels of the pixel data signals of the current frame.

In even more embodiments, the frame memory may be configured to transmit the pixel data signals of the current frame to the pixel data converter, and the pixel data converter may be configured to multiply the pixel data signal of the current frame by the scale factor of the current frame.

In other embodiments of the inventive concept, a driving method for a display device includes: multiplying pixel data signals of a current frame by a scale factor of a previous frame to calculate a conversion current value projected to be consumed by a display panel; comparing the conversion current value with an overcurrent prevention current value; generating a scale factor of the current frame; and converting gray levels of the pixel data signals of the current frame by multiplying the pixel data signals of the current frame by the scale factor of the current frame, wherein the overcurrent prevention current value is less than a maximum current consumption value of the display panel and greater than a threshold current value of the display panel that is also less than the maximum current consumption value.

In some embodiments, the driving method may further include calculating an original current value projected to be consumed by the display panel utilizing the pixel data signals of the current frame when a scale factor is not applied.

In other embodiments, when the conversion current value is greater than the overcurrent prevention current value, the scale factor of the current frame may be set such that a current value to be consumed by the display panel utilizing the pixel data signals of the current frame multiplied by the scale factor of the current frame is less than the overcurrent prevention current value.

In still other embodiments, when the conversion current value is less than the overcurrent prevention current value, the driving method may further include determining whether the conversion current value is within a range of the threshold current value.

In even other embodiments, when the conversion current value is within the range of the threshold current value, the scale factor of the current frame may be set to be the same as the scale factor of the previous frame.

In yet other embodiments, the driving method may further include calculating a value obtained by subtracting the threshold current value from the conversion current value.

In further embodiments, when the conversion current value is outside of the range of the threshold current value, the scale factor of the current frame may be adjusted from the scale factor of the previous frame by an amount corresponding to the value obtained by subtracting the threshold current value from the conversion current value.

BRIEF DESCRIPTION OF THE DRAWINGS

The accompanying drawings are included to provide a further understanding of the inventive concept. The drawings illustrate exemplary embodiments of the inventive concept and, together with the description, serve to explain principles of the inventive concept. In the drawings.

DETAILED DESCRIPTION OF THE EMBODIMENTS

Figure 1:
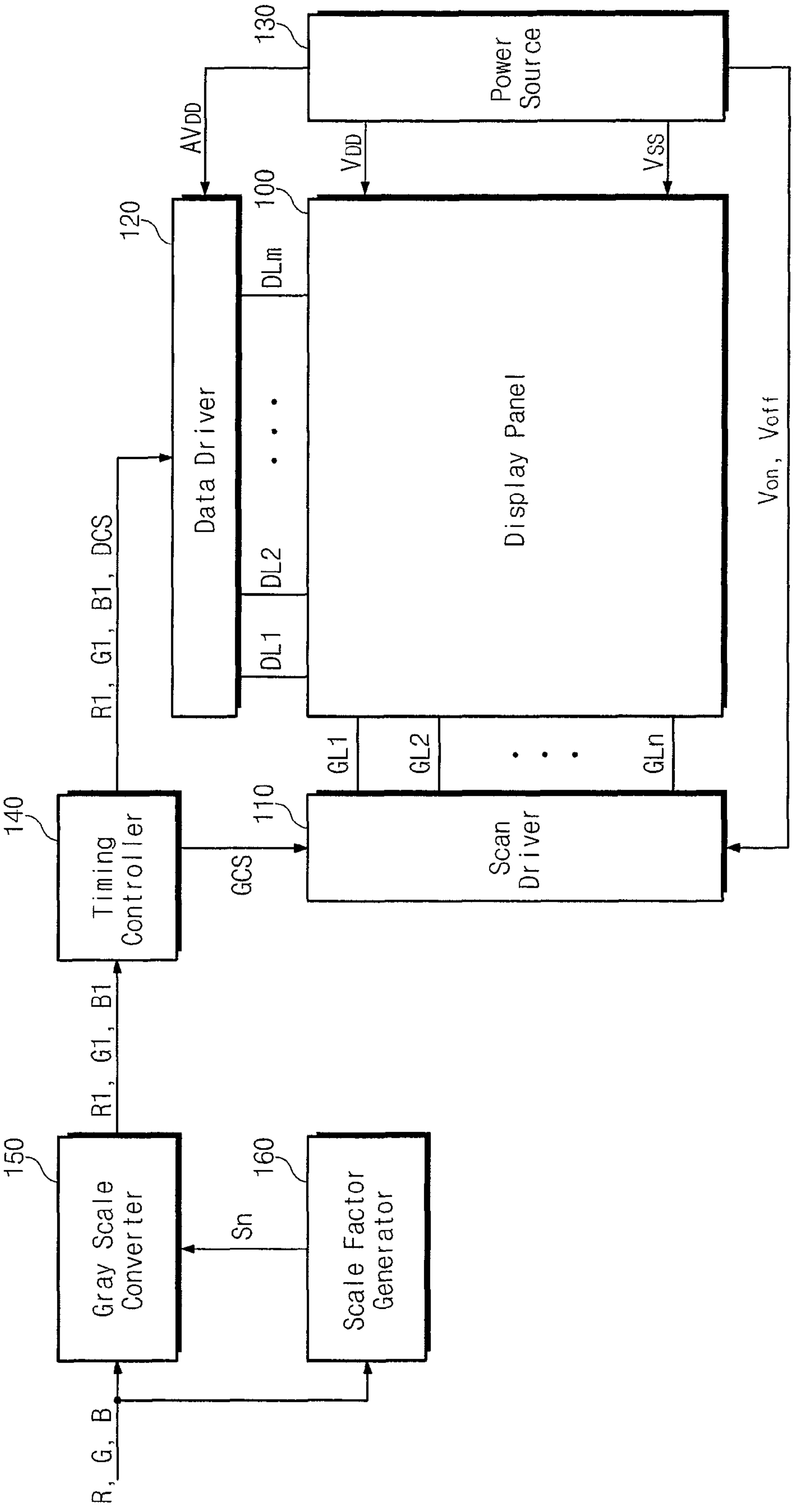
FIG. 1 is a schematic block diagram illustrating a display device according to an embodiment of the inventive concept.

Exemplary embodiments of the inventive concept will be described below in more detail, with reference to the accompanying drawings. The inventive concept may, however, be embodied in different forms, and should not be construed as limited to the embodiments set forth herein. Rather, these embodiments are provided so that this disclosure will be thorough and complete, and will fully convey the scope of the inventive concept to those skilled in the art.

Embodiments described and exemplified herein include any and all complementary embodiments. In the specification, the term "and/or" is used to mean the inclusion of at least one of preceding or succeeding elements. In addition, like reference numerals refer to like elements throughout.

Figure 2:
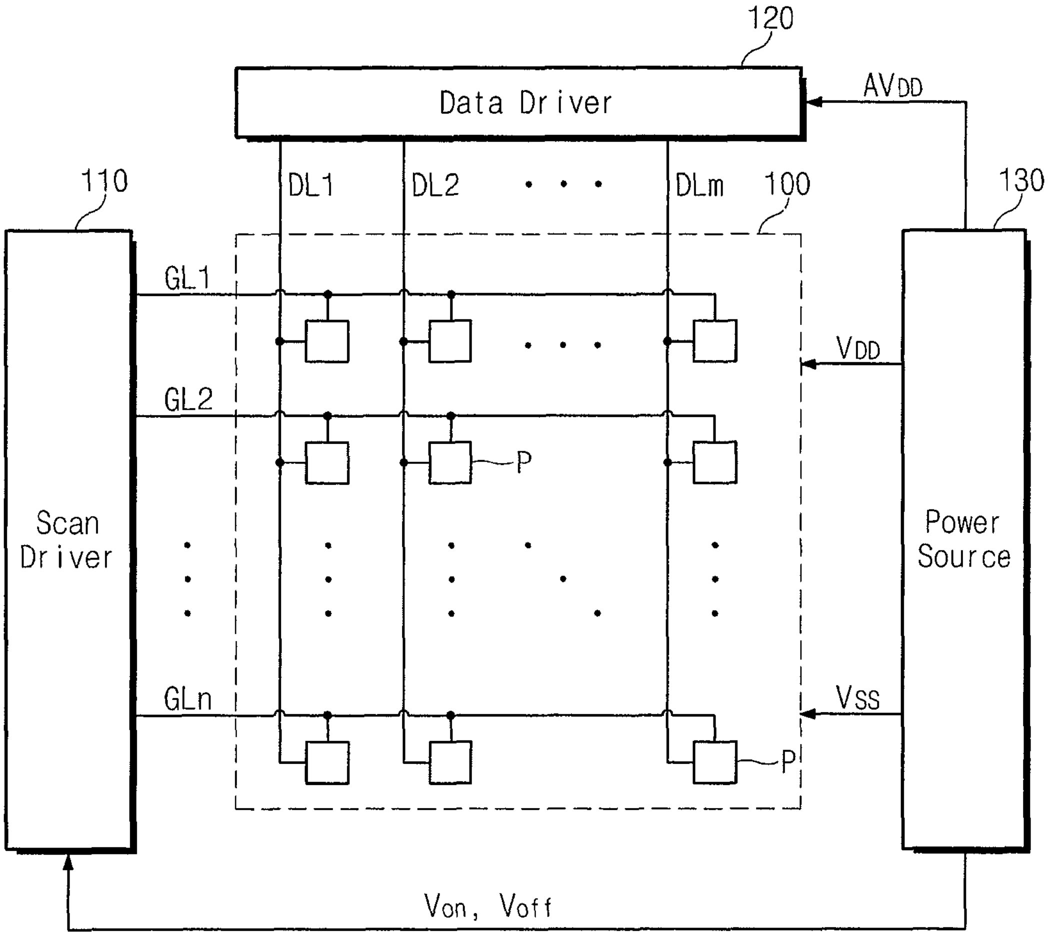
FIG. 2 is a schematic block diagram illustrating a display panel included in a display device according to an embodiment of the inventive concept.
Figure 3:
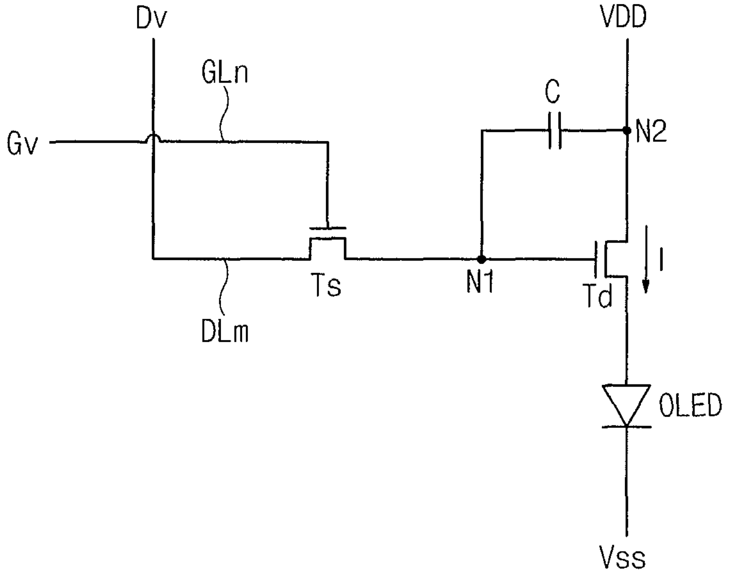
FIG. 3 is a circuit diagram illustrating a pixel included in a display panel of a display device according to an embodiment of the inventive concept.

FIG. 1 is a schematic block diagram illustrating a display device according to an embodiment of the inventive concept. FIG. 2 is a schematic block diagram illustrating a display panel included in a display device according to an embodiment of the inventive concept. FIG. 3 is a circuit diagram illustrating a pixel included in a display panel of a display device according to an embodiment of the inventive concept. For conciseness, a pixel connected to an nth gate line GLn and an mth data line DLm is illustrated.

Referring to FIG. 1, a display device according to an embodiment of the inventive concept includes a display panel 100, a scan driver 110, a data driver 120, a power source 130, a timing controller 140, a gray scale converter 150, and a scale factor generator 160.

Referring to FIG. 2, the display panel 100 may include a plurality of gate lines GL1 to GLn extending in a first direction, a plurality of data lines DL1 to DLm extending in a second direction substantially perpendicular to the first direction and crossing the plurality of gate lines GL1 to GLn, and a plurality of pixel cells P. Each of the pixel cells P may be connected to one gate line and one data line. Pixel cells P aligned in the first direction may form a row, and pixel cells P aligned in the second direction may form a column. Pixel cells P included in the same row may be connected to a same gate line, and pixel cells P included in the same column may be connected to a same data line. The gate lines GL1 to GLn may extend between adjacent rows of pixels P, and the data lines DL1 to DLm may extend between adjacent columns of pixels P.

The gate lines GL1 to GLn may apply a gate voltage Gv supplied from the scan driver 110 to the pixel cells P. The data lines DL1 to DLm may apply a data output voltage Dv supplied from the data driver 120 to the pixel cells P.

Referring to FIG. 3, each of the pixel cells P may include a switching device, a storage device, and/or a light emitting device. The switching device may include a switching transistor Ts and a driving transistor Td. The storage device may be a capacitor C, and the light emitting device may be an organic light emitting diode (OLED).

The OLED may include an anode electrode, a cathode electrode, and an organic emission layer between the anode electrode and the cathode electrode. The organic emission layer may include a hole injection layer (HIL), a hole transport layer (HTL), an emission layer (EML), an electron transport layer (ETL), and/or an electron injection layer (EIL). The hole injection layer may be adjacent to the anode electrode, and the electron injection layer may be adjacent to the cathode electrode. Holes supplied through the hole injection layer and the hole transport layer recombine with electrons supplied through the electron injection layer and the electron transport layer in the emission layer, and the OLED may correspondingly emit light.

The switching transistor Is may be connected between the data line DLm and a first node N1. The switching transistor Ts may be turned on by the gate voltage Gv applied through the gate line GLn and transfer the data output voltage Dv applied through the data line DLm to the first node N1. The data output voltage Dv transferred to the first node N1 may be stored in the storage capacitor C connected between the first node N1 and a second node N2.

The driving transistor Td may be turned on by the data output voltage Dv transferred to the first node N1. When the driving transistor Td is turned on, a driving current I may be applied to an OLED via a voltage difference between a first power source voltage VDD and a second power source voltage VSS. The first power source voltage VDD may be applied to the anode of the OLED, and the second power source voltage VSS may be applied to the cathode of the OLED.

An intensity or magnitude of the driving current I may be determined by the data output voltage Dv applied to the driving transistor Td. A brightness (e.g., a gray level representation) of the OLED may be proportional to the intensity of the driving current I. Accordingly, the brightness of the OLED may be determined by the data output voltage Dv.

Referring again to FIGS. 1 and 2, the scan driver 110 may receive a gate-on voltage Von and a gate-off voltage Voff from the power source 130, receive a gate control signal GCS from the timing controller 140, select any one of the gate lines GL1 to GLn and apply a gate voltage to the selected gate line. The scan driver 110 may control the timing of the gate voltage supplied to the gate lines GL1 to GLn in response to the gate control signal GCS.

For example, the scan driver 110 may sequentially apply the gate voltage from the first gate line GL1 to the nth gate line GLn (e.g., in the second direction). A switching transistor, which is included in a pixel cell connected to the selected gate line receiving the gate voltage, may be turned on, and switching transistors, which are respectively included in pixel cells connected to unselected gate lines not receiving the gate voltage, may be turned off. The scan driver 110 may be directly formed on a substrate where the display panel 100 is formed.

The data driver 120 may receive an analog driving voltage AVDD from the power source 130 and receive the gray scale-converted pixel data signals R1, G1 and B1 of an n-th frame and a data voltage control signal DCS from the timing controller 140. The data driver 120 may convert the gray scale-converted pixel data signals R1, G1 and B1 into analog voltages, and respectively supply data output voltages (e.g., the analog voltages) to the data lines DL1 to DLm. The gray scale-converted pixel data signals R1, G1 and B1 may be converted into data output voltages applied to pixel cells that include a red OLED, a green OLED and a blue OLED, respectively.

The power source 130 may supply a gate-on voltage Von and a gate-off voltage Voff to the scan driver 110. The power source 130 may supply the analog driving voltage AVDD to the data driver 120. The power source 130 may supply the first power source voltage VDD and the second power source voltage VSS that are applied to the OLEDs of the pixel cells P of the display panel 100.

The timing controller 140 may receive the gray scale-converted pixel data signals R1, G1 and B1 of an nth frame from the gray scale converter 150. The timing controller 140 may transmit the gray scale-converted pixel data signals R1, G1 and B1 and the data voltage control signal DCS to the data driver 120, and transmit the gate control signal GCS to the scan driver 110.

The gray scale converter 150 may receive pixel data signals R, G and B of an n-th frame from the outside and receive a scale factor $S_n$ of the n-th frame from the scale factor generator 160. The gray scale converter 150 may multiply the pixel data signals R, G and B by the scale factor $S_n$ to change the gray scale information of a frame to be displayed. Therefore, an overcurrent can be prevented or reduced from flowing in the OLEDs of the display panel 100.

The scale factor generator 160 may receive the pixel data signals R, G and B of the n-th frame and generate the scale factor $S_n$ of the n-th frame. The scale factor $S_n$ may be transmitted to the gray scale converter 150. The gray scale converter 150 and the scale factor generator 160 will be described below in detail with reference to FIGS. 4 and 5.

Figure 4:
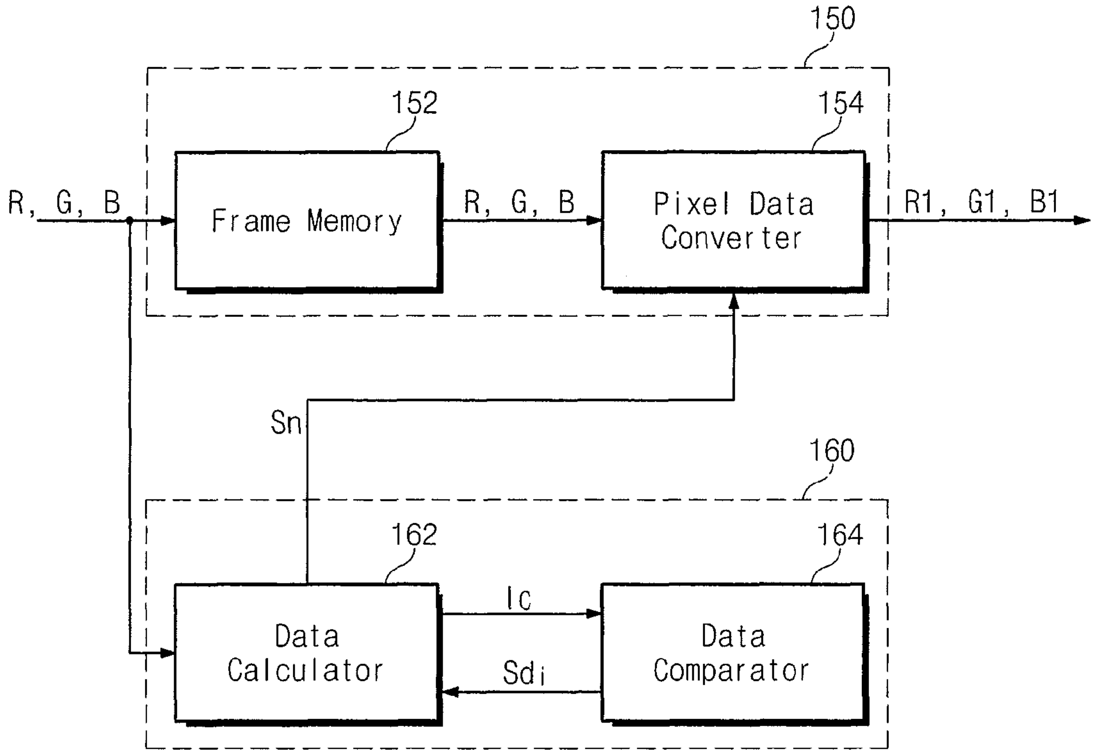
FIG. 4 is a schematic block diagram illustrating a gray scale converter and a scale factor generator which are included in a display device according to an embodiment of the inventive concept.
Figure 5:
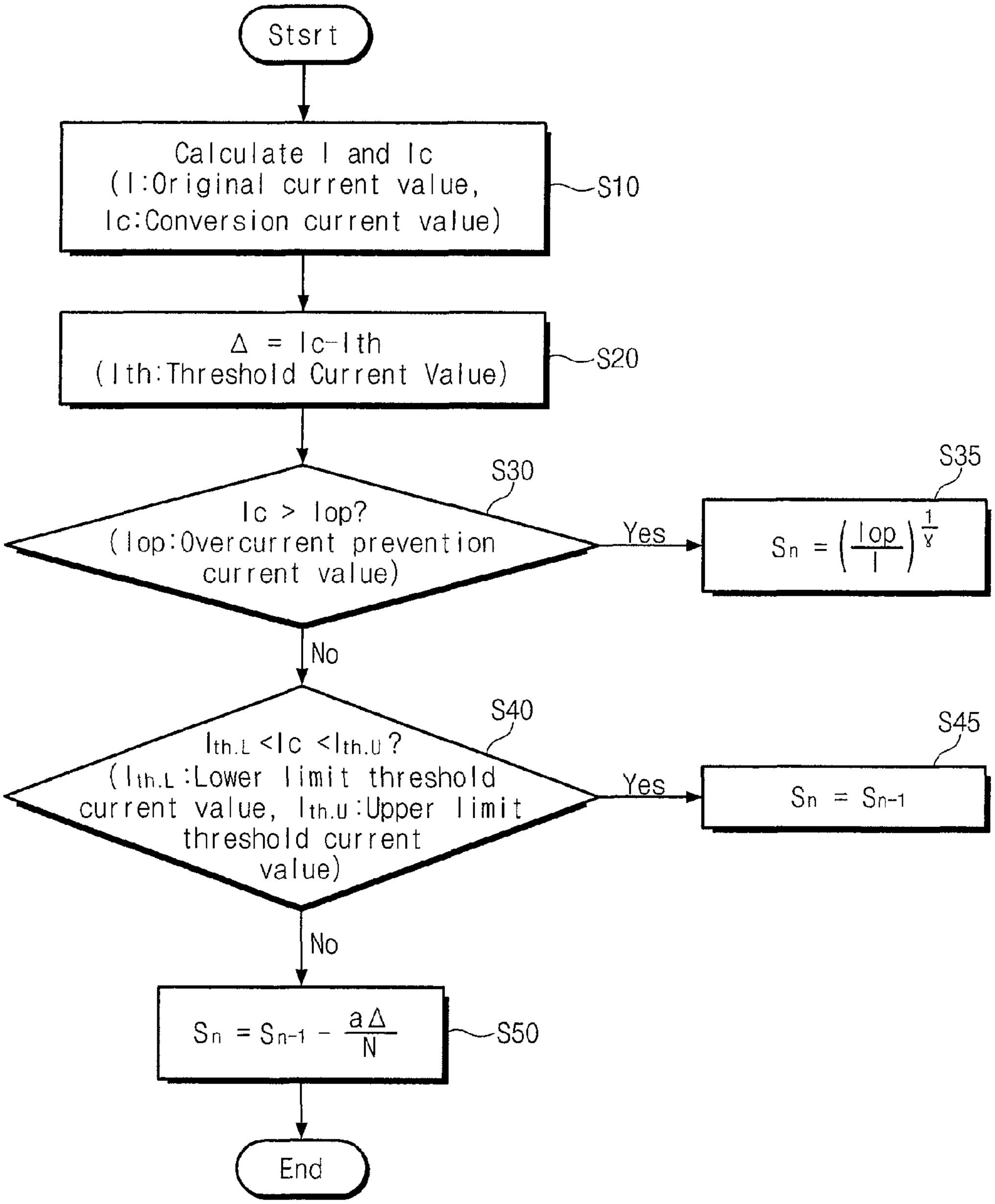
FIG. 5 is a flowchart illustrating an operation of a scale factor generator which is included in a display device according to an embodiment of the inventive concept.

FIG. 4 is a schematic block diagram illustrating a gray scale converter and a scale factor generator which are included in a display device according to an embodiment of the inventive concept. FIG. 5 is a flowchart illustrating an operation of a scale factor generator which is included in a display device according to an embodiment of the inventive concept.

The gray scale converter 150 may include a frame memory 152 and a pixel data converter 154. The frame memory 152 may store the pixel data signals R, G and B of an n-th frame while the scale factor $S_n$ of the n-th frame is being generated. The pixel data converter 154 may receive the pixel data signals R, G and B of the n-th frame from the frame memory 152, receive the scale factor $S_n$ of the n-th frame from the scale factor generator 160, and calculate the gray scale-converted pixel data signals R1, G1 and B1. The gray scale-converted pixel data signals R1, G1 and B1 may have a gray scale-converted value that is obtained, for example, by multiplying the pixel data signals R, G and B of the n-th frame by the scale factor $S_n$ of the n-th frame.

The scale factor generator 160 may include a data calculator 162 and a data comparator 164. The data calculator 162 may receive the pixel data signals R, G and B of the n-th frame and calculate data for calculating the scale factor $S_n$ of the n-th frame. The data calculator 162 may receive a scale factor determination signal Sdi to calculate the scale factor $S_n$, and transmit the scale factor $S_n$ to the pixel data converter 154. The data comparator 164 may compare preset values and data received from the data calculator 162 to generate the scale factor determination signal Sdi, and transmit the generated signal to the data calculator 162. The scale factor generator 160 may generate the scale factor $S_n$ to maintain a current value consumed in the display panel 100 to be below a certain value.

Referring now to FIG. 5, in operation S10, the data calculator 162 may calculate an original current value I and a conversion current value $I_C$ projected or estimated to be consumed in or to be transmitted through the pixel cells P of the display panel 100. The original current value I may be calculated with the pixel data signals R, G and B of the n-th frame transferred to the data calculator 162. The original current value I may be calculated as expressed in Equation (1) below.

$$I \approx E_R \sum^{a} R^{\gamma} + E_G \sum^{b} G^{\gamma} + E_B \sum^{c} B^{\gamma} \tag{1}$$

where a gamma value (γ) is a constant from 1.8 to 2.6 that is changed according to the display panel 100. $E_R$, $E_G$ and $E_B$ are efficiency coefficients that are changed with the kinds of materials included in a red OLED, a green OLED and a blue OLED, respectively. For example, $E_R$ may be 1, $E_G$ may be 2, and $E_B$ may be 4. A value of $R^{\gamma}$ may be added by or correspond to a number "a" of pixel cells including a red OLED. A value of $G^{\gamma}$ may be added by or correspond to a number "b" of pixel cells including a green OLED. A value of BY may be added by or correspond to a number "c" of pixel cells including a blue OLED.

The data calculator 162 may also calculate the conversion current value $I_C$. The conversion current value $I_C$ may be, for example, a current value projected or estimated to be consumed by the display panel 100 in the n-th frame when the pixel data signals R, G and B of the n-th frame are converted with or adjusted by a scale factor $S_{n-1}$ of an n−1-th frame. The conversion current value $I_C$ may be a gray scale-converted value that is obtained by multiplying the pixel data signals R, G and B of the n-th frame by the scale factor $S_{n-1}$ of the n−1-th frame. The conversion current value $I_C$ may be calculated as expressed in Equation (2) below.

$$\begin{aligned} I_C &\approx E_R\sum^{a}(S_{n-1}R)^\gamma + E_G\sum^{b}(S_{n-1}G)^\gamma + E_B\sum^{c}(S_{n-1}B)^\gamma \\ &= S_{n-1}^\gamma \times I \end{aligned} \tag{2}$$

The data calculator 162 may transfer the conversion current value $I_C$ to the data comparator 164.

In operation S20, after the conversion current value $I_C$ is calculated, the data calculator 162 may calculate a variable factor (Δ). The variable factor (Δ) may have or represent, for example, a difference between the conversion current value $I_C$ and a threshold current value $I_{th}$. For example, the variable factor (Δ) may be calculated as expressed in Equation (3) below.

$$\Delta = I_C - I_{th} \tag{3}$$

where the threshold current value $I_{th}$ may be a preset value as, for example, a value lower than a maximum current consumption value of the display panel 100. The threshold current value $I_{th}$ may have or represent, for example, about 20 to 30% of the maximum current consumption value. For example, the threshold current value $I_{th}$ may be set to be about 6 A when the maximum current consumption value of the display panel 100 is about 30 A.

The data comparator 164 may compare the conversion current value $I_C$ received from the data calculator 162 with an overcurrent prevention current value $I_{OP}$, an upper limit threshold current value $I_{th,U}$, and/or a lower limit threshold current value $I_{th,L}$, to determine and transmit a scale factor determination signal Sdi to the data calculator 162.

In operation 330, The data comparator 164 may compare the conversion current value $I_C$ and an overcurrent prevention current value $I_{OP}$. The overcurrent prevention current value $I_{OP}$ may be a preset value representing an amount of current that the actual current flowing in the display panel 100 should not exceed. The overcurrent prevention current value $I_{OP}$ may be set to be a value greater than the threshold current value $I_{th}$ and less than the maximum current consumption value. The overcurrent prevention current value $I_{OP}$ may be, for example, about 40% of the maximum current consumption value. For example, the overcurrent prevention current value $I_{OP}$ may be set to be about 12 A when the maximum current consumption value is about 30 A.

The data comparator 164 compares the conversion current value $I_C$ and the overcurrent prevention current value $I_{OP}$, and when the conversion current value $I_C$ is greater than the overcurrent prevention current value $I_{OP}$, the data comparator 164 may transmit a first scale factor determination signal Sd1 to the data calculator 162. The data calculator 162 may then calculate the scale factor $S_n$ of the nth frame in response to or based on the first scale factor determination signal Sd1.

In operation S35, the data calculator 162 may set the scale factor $S_n$ of the nth frame, such that the original current value I projected to be consumed in the display panel 100 is adjusted so as not to exceed the overcurrent prevention current value $I_{OP}$, in response to the first scale factor determination signal Sd1. For example, the scale factor $S_n$ may be set to satisfy the condition of Equation (4) below.

$$S_n^\gamma \times I \le I_{OP} \tag{4}$$

The scale factor $S_n$ may have a value that is inversely proportional to the original current value I and proportional to the overcurrent prevention current value $I_{OP}$. For example, the scale factor $S_n$ may be calculated as expressed in Equation (5) below.

$$S_n = \left(\frac{I_{OP}}{I}\right)^{\frac{1}{\gamma}} \tag{5}$$

The scale factor $S_n$ may be transmitted to the pixel data converter 154 and multiplied with the pixel data signals R, G and B of the n-th frame, thereby converting the corresponding gray levels. The final (e.g., adjusted) current value $I_f$ to be consumed by utilizing the gray scale-converted pixel data signals R1, G1 and B1 of the n-th frame may be calculated as expressed in Equation (6) below.

$$I_f \approx E_R\sum^{a}(S_nR)^\gamma + E_G\sum^{b}(S_nG)^\gamma + E_B\sum^{c}(S_nB)^\gamma = S_n^\gamma \times I \tag{6}$$

Referring back to Equation (2), when the conversion current value $I_C$ calculated with the scale factor $S_{n-1}$ of an n−1-th frame exceeds an overcurrent prevention current value $I_{OP}$, the scale factor $S_n$ of the n-th frame may then be set in order for the final current value $I_f$ consumed in the n-th frame to stay below and not to exceed the overcurrent prevention current value $I_{OP}$.

Therefore, according to an embodiment of the inventive concept, a current value to be consumed by the display panel 100 in the n-th frame should not exceed the overcurrent prevention current value $I_{OP}$, and thus an overcurrent flowing in the display panel 100 can be minimized or reduced. Therefore, overcurrents being supplied to the OLEDs of the display panel 100 are minimized or reduced, and accordingly, a display device can be provided which has high reliability, is optimized for low power consumption, and has an increased service life.

When the conversion current value $I_C$ is less than the overcurrent prevention current value $I_{OP}$, in operation S40, the data comparator 164 may compare whether the conversion current value $I_C$ is within a range from a lower limit threshold current value $I_{th,L}$ to an upper limit threshold current value $I_{th,U}$. The lower limit threshold current value $I_{th,L}$ may be a value that is preset to be lower than the threshold current value $I_{th}$, and the upper limit threshold current value $I_{th,U}$ may be a value that is preset to be higher than the threshold current value $I_{th}$. For example, the lower limit threshold current value $I_{th,L}$ may be less than the threshold current value $I_{th}$ by about 1% of the threshold current value $I_{th}$, and the upper limit threshold current value $I_{th,U}$ may be greater than the threshold current value $I_{th}$ by about 1% of the threshold current value $I_{th}$.

When the conversion current value $I_C$ is within the range from the lower limit threshold current value $I_{th,L}$ to the upper limit threshold current value $I_{th,U}$, the data comparator 164 may transmit a second scale factor determination signal Sd2 to the data calculator 162. The data calculator 162 may then calculate the scale factor $S_n$ in response to or based on the second scale factor determination signal Sd2.

In operation S45, the data calculator 162 may set the scale factor $S_n$ of the n-th frame to be equal to or the same as the scale factor $S_{n-1}$ of the n−1-th frame, in response to the second scale factor determination signal Sd2. Accordingly, the conversion current value $I_C$ may substantially correspond to a total current value to be used in the display panel 100. As described above, when there is a fine or small difference between the conversion current value $I_C$ and the threshold current value $I_{th}$, such that the conversion current value $I_C$ has a value between the lower limit threshold current value $I_{th,L}$ and the upper limit threshold current value $I_{th,U}$, the scale factor $S_n$ may be fixed or remain the same. Therefore, an amount of current flowing in the display panel 100 may be prevented from having fine fluctuations, or occurrences of the same may be reduced, and thus a display device having high reliability and more stability can be provided.

That is, although there may be fine differences between the conversion current value $I_C$ and the threshold current value $I_{th}$ by, for example, a degree where the conversion current value $I_C$ has a value within the range from the lower limit threshold current value $I_{th,L}$ to the upper limit threshold current value $I_{th,U}$, if the scale factor $S_n$ is constantly changed, the scale factor $S_n$ may also finely fluctuate. That is, even when a fine or small difference between the conversion current value $I_C$ and the threshold current value $I_{th}$ occurs due to noise or the like, the scale factor $S_n$ may consequently fluctuate in each frame as well. Therefore, a current value flowing in the display panel 100 may also constantly fluctuate, and operation of the display panel 100 may be unstable.

However, according to an embodiment of the inventive concept, as described above, although there may be fine differences between the conversion current value $I_C$ and the threshold current value $I_{th}$, when the conversion current value $I_C$ has a value between the lower limit threshold current value $I_{th,L}$ and the upper limit threshold current value $I_{th,U}$, the scale factor $S_n$ may be fixed or remain constant, and thus a display device having high reliability and more stability can be provided.

When the conversion current value $I_C$ is not within the range from the lower limit threshold current value $I_{th,L}$ to the upper limit threshold current value $I_{th,U}$, the data comparator 164 may transmit a third scale factor determination signal Sd3 to the data calculator 162. The data calculator 162 may then calculate the scale factor $S_n$ of the n-th frame in response to or based on the third scale factor determination signal Sd3.

In operation S50, the data calculator 162 may calculate the scale factor $S_n$ of the n-th frame as expressed in Equation (7) below, in response to the third scale factor determination signal Sd3.

$$S_n = S_{n-1} - \frac{a\Delta}{N} \tag{7}$$

where "a" may be a preset positive constant having an absolute value equal to or less than 1, and "N" may be a preset constant between, for example, 32 to 1024. The constants "a" and "N" may be set in order for the scale factor to have a value between 0 and 1.

When "N" has too low a value, the amount of change or variation in the scale factor $S_n$ may be large, and therefore, a difference of current values consumed by the display panel 100 in each frame may also be large, thereby degrading the reliability of performance of the display device. On the other hand, when "N" has too high a value, the amount of change or variation in the scale factor $S_n$ may be too small, and therefore, it may be more difficult to control or adjust current values consumed by the display panel 100 because an adjustment amount of current values consumed by the display panel 100 in each frame may not be adjusted significantly. Therefore, "N" may be set on the basis of the above-described considerations. For example, in one embodiment, "N" may be set to be 56.

When the conversion current value $I_C$ is less than the lower limit threshold current value $I_{th,L}$, the variable factor (Δ) may be calculated as a negative value. Accordingly, the scale factor $S_n$ of the n-th frame may be increased to be greater than the scale factor $S_{n-1}$ of the n−1-th frame. On the other hand, when the conversion current value $I_C$ is greater than the upper limit threshold current value $I_{th,U}$, the variable factor (Δ) may be calculated as a positive value. Therefore, the scale factor $S_n$ of the n-th frame may be decreased to be less than the scale factor $S_{n-1}$ of the n−1-th frame.

After the scale factor $S_n$ of the n-th frame is determined, the scale factor $S_n$ of the n-th frame may then be transferred to the pixel data converter 154 and be multiplied by the pixel data signals R, G and B of the n-th frame.

Figure 6:
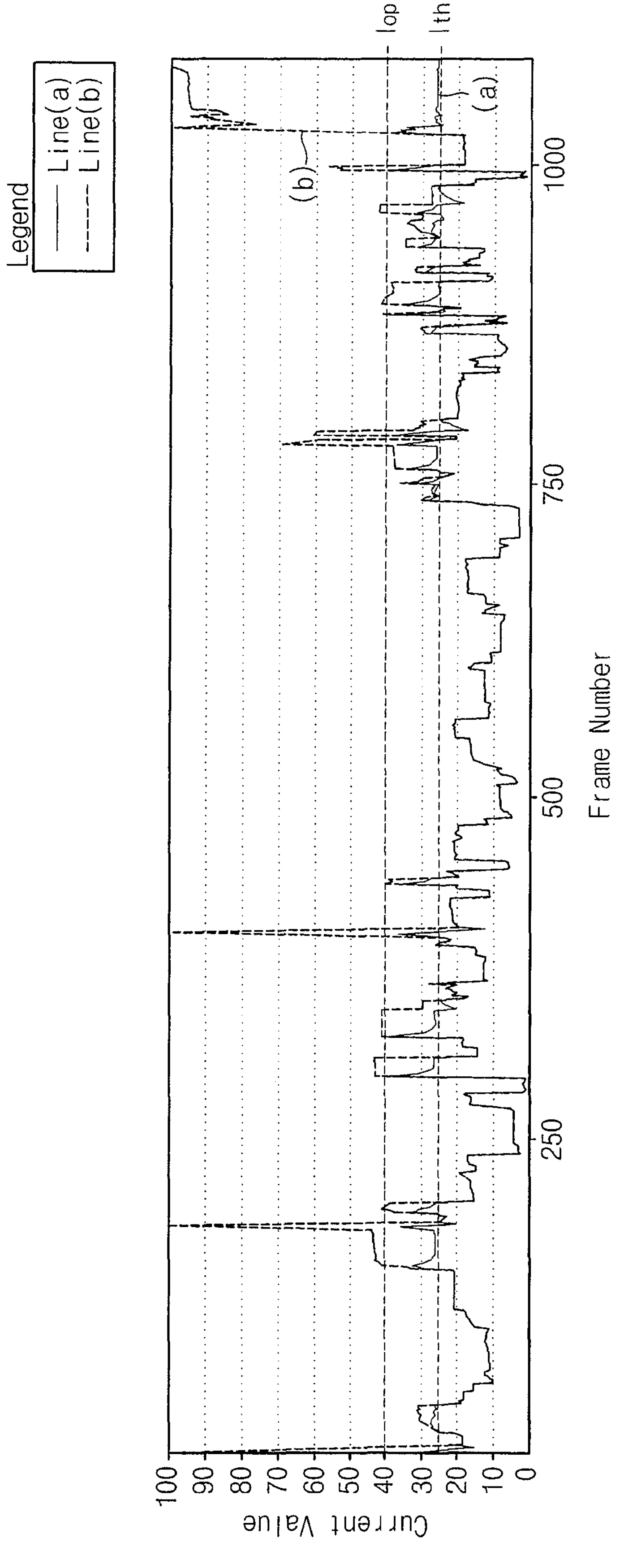
FIG. 6 is a diagram showing a simulation result of a display device according to an embodiment of the inventive concept.

FIG. 6 is a diagram showing a simulation result of a display device according to an embodiment of the inventive concept.

Referring to FIG. 6, the X axis indicates number of frames, and the Y axis indicates current consumption. It is assumed in FIG. 6 that a maximum current consumption value is 100 (e.g., 100% consumption). A line (a) of FIG. 6 shows a measured result of current consumption values of a display panel of a display device including a scale factor generator according to an embodiment of the inventive concept, and it is assumed that in the embodiment, an overcurrent prevention current value $I_{OP}$ is set to be about 40% of the maximum current consumption value and the threshold current value $I_{th}$ is set to be about 25% of the maximum current consumption value. A line (b) of FIG. 6 shows a measured result of current consumption values of a display panel of a display device when the operation of FIG. 5 is omitted (e.g., without a scale factor generator as described in embodiments of the inventive concept). In the line (a) of FIG. 6, a current value consumed in the display panel may temporarily or briefly be higher than the threshold current value $I_{th}$, but it should not exceed the overcurrent prevention current value $I_{OP}$. However, in the line (b) of FIG. 6, frames exist where an overcurrent flowing in the display panel not only exceeds the threshold current value $I_{th}$, but also greatly exceeds the overcurrent prevention current value $I_{OP}$. According to an embodiment of the inventive concept, therefore, an overcurrent exceeding the overcurrent prevention current value $I_{OP}$ is prevented or reduced from flowing to the display panel, and thus the reliability and service life of the display panel can increase or improve.

Figure 7:
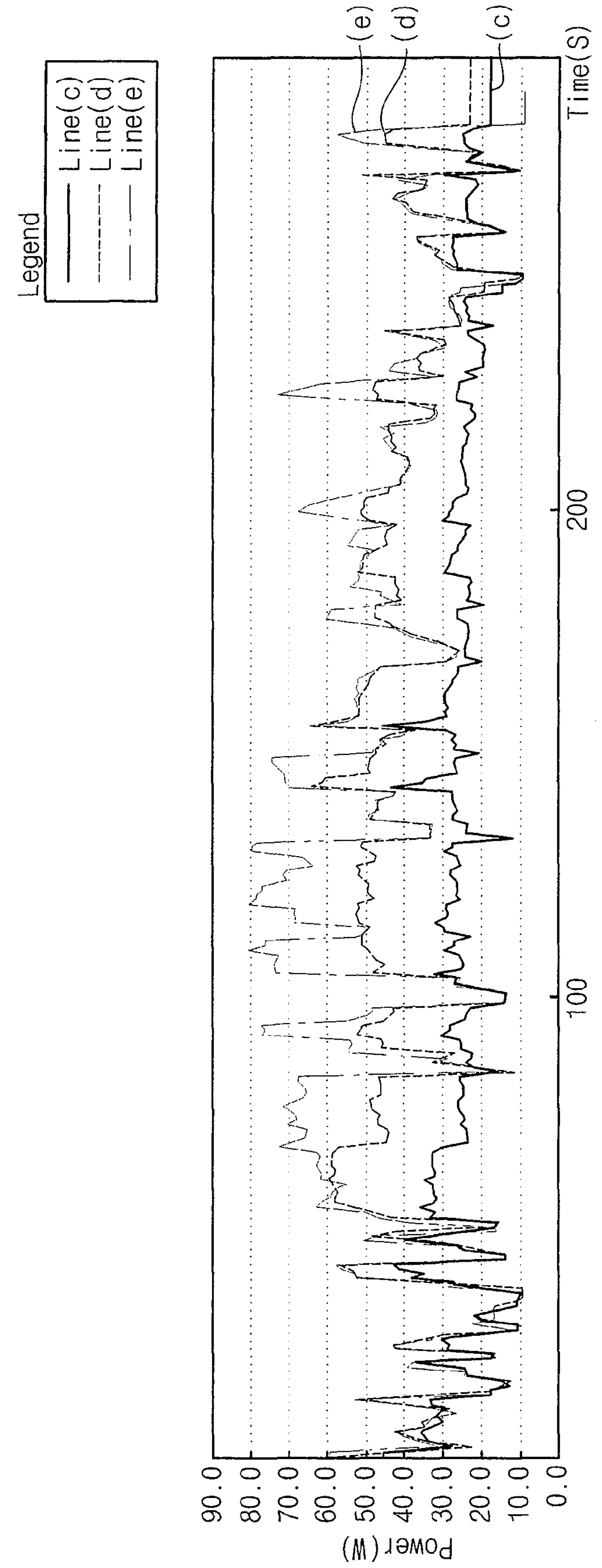
FIG. 7 is a diagram showing a simulation result of a display device according to an embodiment of the inventive concept.

FIG. 7 is a diagram showing a simulation result of a display device according to an embodiment of the inventive concept.

Referring to FIG. 7, the X axis indicates time "s", and the Y axis indicates power consumption of the display panel. Lines (c) and (d) of FIG. 7 show measured results of power consumption based on time in a display device including a scale factor generator according to embodiments of the inventive concept. For the line (c) of FIG. 7, an overcurrent prevention current value $I_{OP}$ was set to about 40% of the maximum current value, and a threshold current value $I_{th}$ was set to about 25% of the maximum current value. For the line (d) of FIG. 7, the overcurrent prevention current value $I_{OP}$ was set to about 40% of the maximum current value and the threshold current value $I_{OP}$ was set to about 35% of the maximum current value. The line (e) of FIG. 7 shows a measured result of power consumption of a display device which does not include a scale factor generator according to an embodiment of the inventive concept. As can be seen, for example, in FIG. 7, the power consumption of a display device including a scale factor generator according to embodiments of the inventive concept is lower than the power consumption of a display device which does not include a scale factor generator. Also, when the overcurrent prevention current values $I_{OP}$ are the same, the power consumption of the display panel may be further controlled based on, for example, variations in the threshold current value $I_{th}$. Therefore, a display device optimized for low power can be provided.

A display device according to embodiments of the inventive concept includes a scale factor generator that compares a conversion current value and an overcurrent prevention current value to generate a scale factor for an n-th frame, and a gray scale converter that converts a gray scale or gray levels of pixel data signals of the n-th frame by, for example, multiplying them with the scale factor of the n-th frame. The scale factor of the n-th frame is set such that total current values to be consumed by the gray scale-converted pixel data of the n-th frame should not exceed the overcurrent prevention current value, and thus a display device having high reliability can be implemented.

The above-disclosed subject matter is to be considered illustrative and not restrictive, and the appended claims are intended to cover any and all modifications, enhancements, and/or other embodiments, which fall within the true spirit and scope of the inventive concept. Thus, the scope of the inventive concept is to be determined based on a broadest permissible interpretation of the following claims and their equivalents, and shall not be restricted or limited by the foregoing detailed description.

What is claimed is:

1. A display device comprising:

a display panel comprising a plurality of pixels;

a gray scale converter for converting gray levels of pixel data signals of a current frame by multiplying the pixel data signals of the current frame by a scale factor of the current frame; and a scale factor generator configured to compare a conversion current value with an overcurrent prevention current value and to compare the conversion current value with a threshold current value of the display panel that is less than the overcurrent prevention current value, and to generate the scale factor of the current frame by applying one of a first equation utilizing the overcurrent prevention current value or a second equation different from the first equation and utilizing the threshold current value, wherein the conversion current value is a current value projected to be consumed by the display panel utilizing the pixel data signals of the current frame multiplied by a scale factor of a previous frame, and wherein the overcurrent prevention current value and the threshold current value are less than a maximum current consumption value of the display panel.

2. The display device of claim 1, wherein when the conversion current value is greater than the overcurrent prevention current value, the scale factor of the current frame is configured to be decreased when an original current value projected to be consumed by the display panel when a scale factor is not applied is increased.

3. The display device of claim 2, wherein the scale factor of the current frame is set to be a value obtained by dividing the overcurrent prevention current value by the original current value, and then raising the result to the 1/γ-th power, wherein γ corresponds to a gamma value of the display panel.

4. The display device of claim 1, wherein when the conversion current value is less than the overcurrent prevention current value, the scale factor generator is configured to compare the conversion current value with a lower limit threshold current value and an upper limit threshold current value to generate the scale factor of the current frame, and wherein the lower limit threshold current value is less than the threshold current value, and the upper limit threshold current value is greater than the threshold current value and less than the overcurrent prevention current value.

5. The display device of claim 4, wherein a difference between the lower limit threshold current value and the threshold current value and a difference between the upper limit threshold current value and the threshold current value are each equal to or less than about 1% of the threshold current value.

6. The display device of claim 4, wherein when the conversion current value has a value between the lower limit threshold current value and the upper limit threshold current value, the scale factor of the current frame is set to be the same as the scale factor of the previous frame.

7. The display device of claim 4, wherein when the conversion current value is outside of a range from the lower limit threshold current value to the upper limit threshold current value, the scale factor of the current frame is adjusted from the scale factor of the previous frame by an amount proportional to a value obtained by subtracting the threshold current value from the conversion current value.

8. The display device of claim 7, wherein when the conversion current value is less than the lower limit threshold current value, the scale factor of the current frame is adjusted to be greater than the scale factor of the previous frame.

9. The display device of claim 7, wherein when the conversion current value is greater than the upper limit threshold current value, the scale factor of the current frame is adjusted to be less than the scale factor of the previous frame.

10. The display device of claim 1, wherein the scale factor of the current frame and the scale factor of the previous frame are each greater than 0 and equal to or less than 1.

11. The display device of claim 1, wherein the gray scale converter comprises:

a frame memory for storing the pixel data signals of the current frame; and a pixel data converter for converting the gray levels of the pixel data signals of the current frame.

12. The display device of claim 11, wherein:

the frame memory is configured to transmit the pixel data signals of the current frame to the pixel data converter, and the pixel data converter is configured to multiply the pixel data signals of the current frame by the scale factor of the current frame.

13. A driving method for a display device, the driving method comprising:

multiplying pixel data signals of a current frame by a scale factor of a previous frame to calculate a conversion current value projected to be consumed by a display panel;

comparing the conversion current value with an overcurrent prevention current value;

comparing the conversion current value with a threshold current value of the display panel that is less than the overcurrent prevention current value when the conversion current value is less than the overcurrent prevention current value;

generating a scale factor of the current frame by applying one of a first equation utilizing the overcurrent prevention current value or a second equation different from the first equation and utilizing the threshold current value; and converting gray levels of the pixel data signals of the current frame by multiplying the pixel data signals of the current frame by the scale factor of the current frame, wherein the overcurrent prevention current value and the threshold current value are less than a maximum current consumption value of the display panel.

14. The driving method of claim 13, further comprising calculating an original current value projected to be consumed by the display panel utilizing the pixel data signals of the current frame when a scale factor is not applied.

15. The driving method of claim 14, wherein when the conversion current value is greater than the overcurrent prevention current value, the scale factor of the current frame is set such that a current value to be consumed by the display panel utilizing the pixel data signals of the current frame multiplied by the scale factor of the current frame is less than the overcurrent prevention current value.

16. The driving method of claim 13, wherein when the conversion current value is compared with the threshold current value, the driving method comprises determining whether the conversion current value is within a range of the threshold current value.

17. The driving method of claim 16, wherein when the conversion current value is within the range of the threshold current value, the scale factor of the current frame is set to be the same as the scale factor of the previous frame.

18. The driving method of claim 16, further comprising calculating a value obtained by subtracting the threshold current value from the conversion current value.

19. The driving method of claim 18, wherein when the conversion current value is outside of the range of the threshold current value, the scale factor of the current frame is adjusted from the scale factor of the previous frame by an amount corresponding to the value obtained by subtracting the threshold current value from the conversion current value.

20. A display device comprising:

a display panel comprising a plurality of pixels;

a gray scale converter for converting gray levels of pixel data signals of a current frame by multiplying the pixel data signals of the current frame by a scale factor of the current frame; and a scale factor generator configured to compare a conversion current value with an overcurrent prevention current value to generate the scale factor of the current frame, wherein the conversion current value is a current value projected to be consumed by the display panel utilizing the pixel data signals of the current frame multiplied by a scale factor of a previous frame, wherein the overcurrent prevention current value is less than a maximum current consumption value of the display panel and greater than a threshold current value of the display panel that is also less than the maximum current consumption value, and wherein the scale factor of the current frame is set to be a value obtained by dividing the overcurrent prevention current value by an original current value projected to be consumed by the display panel, and then raising the result to the 1/γ-th power, wherein γ corresponds to a gamma value of the display panel.

21. A driving method for a display device, the driving method comprising:

multiplying pixel data signals of a current frame by a scale factor of a previous frame to calculate a conversion current value projected to be consumed by a display panel;

comparing the conversion current value with an overcurrent prevention current value;

generating a scale factor of the current frame; and converting gray levels of the pixel data signals of the current frame by multiplying the pixel data signals of the current frame by the scale factor of the current frame, wherein the overcurrent prevention current value is less than a maximum current consumption value of the display panel and greater than a threshold current value of the display panel that is also less than the maximum current consumption value, and wherein the scale factor of the current frame is set to be a value obtained by dividing the overcurrent prevention current value by an original current value projected to be consumed by the display panel, and then raising the result to the 1/γ-th power, wherein γ corresponds to a gamma value of the display panel.

* * * * *